Nov. 7, 1967   J. L. ROOF ET AL   3,351,845
EXCITATION SYSTEM FOR A DYNAMOELECTRIC MACHINE
Filed July 16, 1964   3 Sheets-Sheet 1

WITNESSES:
Bernard R. Gregory
James F. Young

INVENTORS
James L. Roof and
Larry L. Hire.
BY
Donald R. Lackey
ATTORNEY

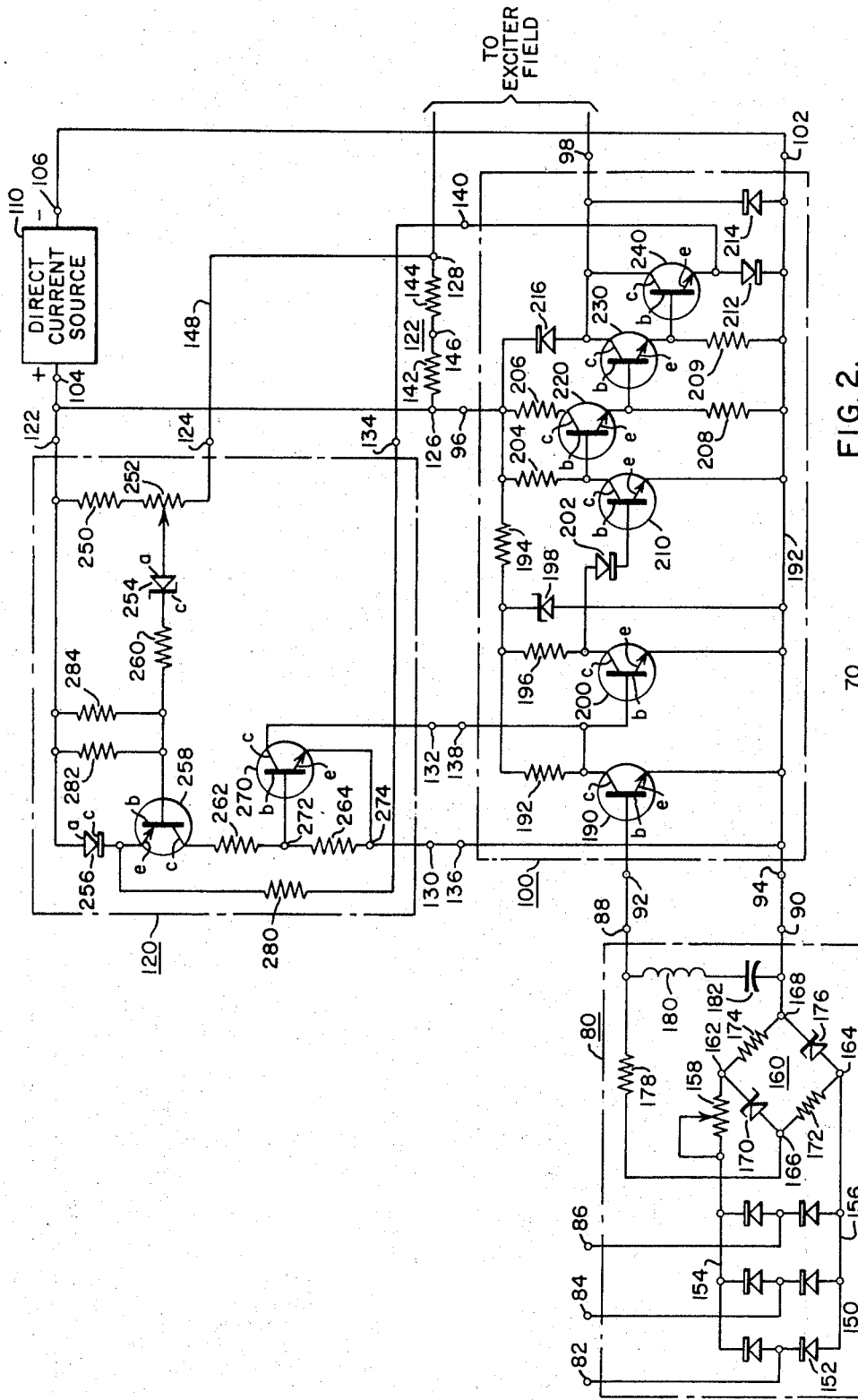

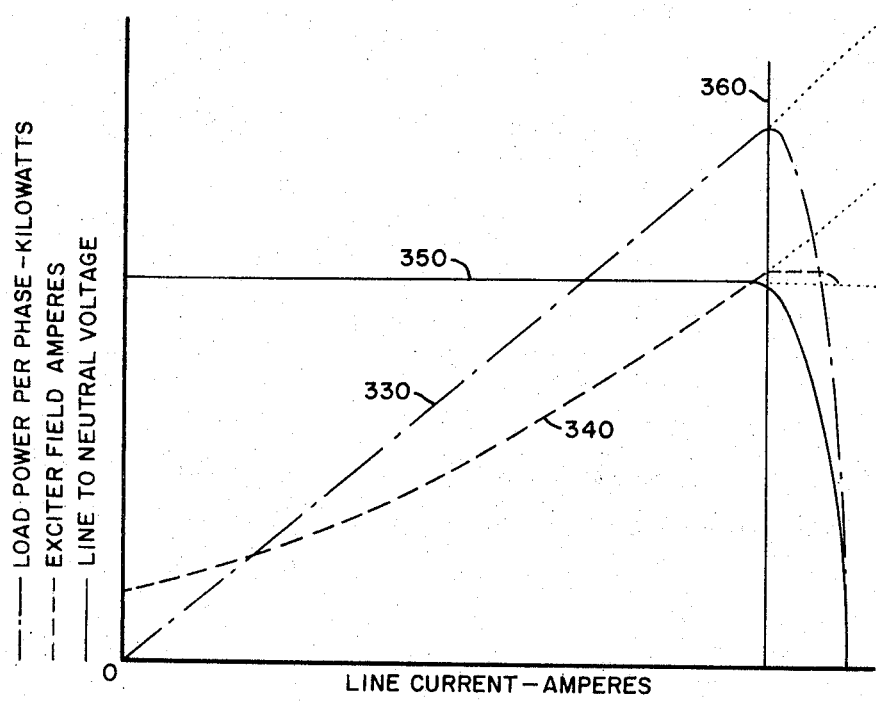
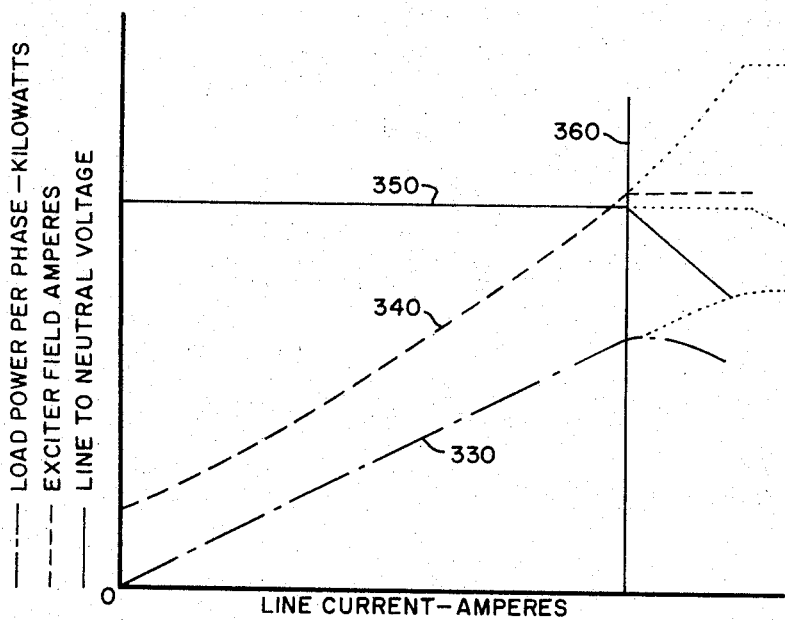

United States Patent Office 3,351,845
Patented Nov. 7, 1967

3,351,845
EXCITATION SYSTEM FOR A DYNAMO-
ELECTRIC MACHINE
James L. Roof, Fort Shawnee, and Larry L. Hire, Lima, Ohio, assignors to Westinghouse Electric Corporation, East Pittsburgh, Pa., a corporation of Pennsylvania
Filed July 16, 1964, Ser. No. 383,037
8 Claims. (Cl. 322—87)

This invention relates in general to excitation systems for dynamoelectric machines, and more particularly to electrical control apparatus for limiting the excitation current provided by excitation systems.

Aircraft electrical generator-regulator systems, in certain applications, are capable of delivering electrical power for short periods of time that greatly exceeds the power capability of the prime mover and input shaft. The Federal Aviation Agency (FAA) in certain applications requires that means be provided for limiting the overload power output of aircraft generators in order to prevent shearing of the input drive shafts to the generators and to prevent damage to the prime mover. Excitation systems of the prior art, utilizing means for power or torque limiting, have, in general, been unsatisfactory due to instability while in the torque limiting mode, and due to relatively low gain which makes the limiting value change with load conditions.

Accordingly, it is an object of the invention to provide a new and improved excitation system for dynamoelectric machines.

Another object of the invention is to provide a new and improved voltage regulating system for dynamoelectric machines that limits the output power of the machines.

A further object of the invention is to provide a new and improved voltage regulating system for dynamoelectric machines that limits the excitation current applied to the field winding of the dynamoelectric machine to a predetermined value.

Another object of the invention is to provide new and improved electrical control apparatus for limiting the excitation current applied to the field winding of a dynamoelectric machine without producing system oscillations and other instabilities.

Still another object of the invention is to provide new and improved electrical control apparatus for limiting the excitation current of a dynamoelectric machine which has a high gain, making the limiting excitation current magnitude independent of load conditions.

Briefly, the present invention accomplishes the above cited objects by providing electrical control apparatus which limits the output current supplied by the voltage regulating system to the exciter field. The limiting circuit has a very high gain, which allows it to function on slight changes in the magnitude of the excitation current, and makes the limiting value substantially independent of load conditions. The high gain allows the limiting circuit to be responsive to the ripple component in the excitation current instead of merely to the direct current level, turning the excitation current on and off at the ripple frequency when the limiting magnitude is reached. The switching rate of the excitation current is too high for the generator-drive system to follow, resulting in the desired system stability, and the elimination of oscillations produced by the limiting circuits which sense the direct current level.

More specifically, the limiting circuit cooperates with a switching transistor in the regulator system, which is connected in series with the exciter field winding, turning the switching transistor on and off at the ripple frequency when the limiting magnitude of excitation current is reached. The ratio of on-to-off time is automatically adjusted to provide pulses of excitation current whose average does not exceed the limiting magnitude. The limiting circuit senses the magnitude of excitation current by sensing the voltage drop across an impedance means connected in series with the exciter field winding, with the high frequency ripple being induced into the field winding circuit from the rotating rectifier circuit of the exciter. When the ripple in the sensed voltage drop exceeds the reference voltage determined by an adjustable impedance and a Zener type diode, a transistor is switched on and off at the ripple frequency and the switching transistor in the regulating system responsively modulates the excitation voltage to provide an average excitation current which does not exceed the limiting value. When the excitation current magnitude drops below the limiting value, the regulating system resumes its normal function and the limiting circuit returns to its quiescent mode.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIG. 2 is a schematic diagram of a regulating system and limiter circuit which embodies the teachings of the invention;

FIGS. 4 and 5 are graphs illustrating the effect of the limiter circuit on the various circuit parameters.

Figure 1:
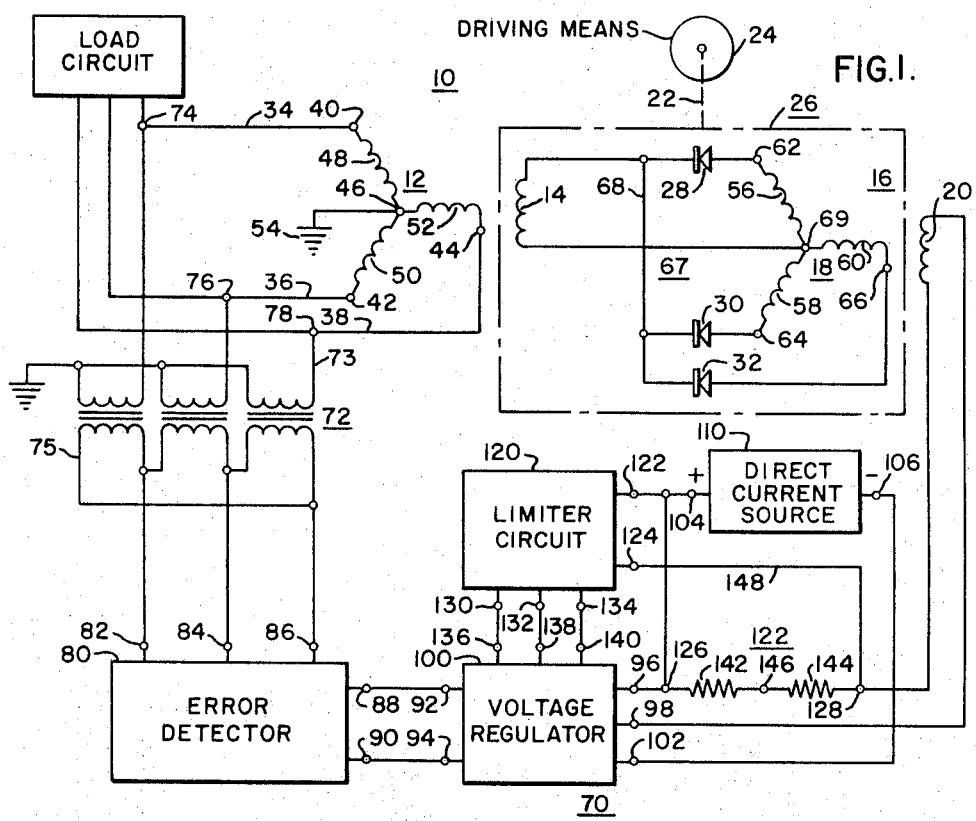
FIGURE 1 is a block diagram illustrating a dynamoelectric machine and a general arrangement of a regulating-excitation system that may embody the teachings of the invention.

Referring now to the drawings, and FIG. 1 in particular, there is shown a dynamoelectric machine 10, such as a brushless alternating current generator, having an armature 12 and a field winding 14. In order to provide excitation current of the desired magnitude for field winding 14, an exciter 16, having an armature 18 and a field winding 20, may be utilized. The armature 18 of the exciter 16 and field winding 14 of the alternating current generator 10 may be integrally mounted on the same drive shaft 22, driven by driving means 24. Driving means 24 may be constant speed, if it is desired to obtain a constant predetermined output frequency from generator 10. The dotted outline 26 indicates the portion of the generator-exciter system driven by input drive shaft 22, with rectifiers 28, 30 and 32 being connected between the output of exciter armature 18 and generator field winding 14 to provide the necessary direct current excitation potential.

The armature 12 of alternating current generator 10 is disposed to supply alternating current energy to a load circuit through line conductors 34, 36 and 38 from output terminals 40, 42 and 44, respectively. The neutral 46 of the Y connected phase windings 48, 50 and 52 may be grounded at 54.

The exciter armature windings 56, 58 and 60 may be connected in Y, having output terminals 62, 64 and 66 respectively. Rectifiers 28, 30 and 32 form a half wave, three-phase rectifiers 67, with armature field winding 14 being connected from the output conductor 78 of the rectifier 67 to the neutral 69 of the wye connected exciter armature windings 56, 58 and 60.

The regulator-excitation system 70 is of the closed-loop type, controlling the average magnitude of the excitation current through exciter field winding 20 in response to the output voltage of alternating current generator 10. It is the function of the regulator-excitation system 70 to provide the average excitation current to exciter field winding 20 required to maintain the alternating potential on the conductors 34, 36 and 38 at the desired magnitude for all circuit conditions. This may be accomplished by obtaining a voltage proportional to the output voltage of the alternating current generator 10, such as through potential transformer 72. Potential transformer 72 has its primary windings 73 connected to line conductors 34, 36 and 38 at junctions 74, 76 and 78, respectively, and its secondary windings 75 connected to error detector circuit 80 at terminals 82, 84 and 86. Error detector circuit 80 compares the signal or voltage proportional to the output voltage of alternating current generator 10 with a reference voltage, and any deviation appears at its output terminals 88 and 90 as an error signal. The error signal is applied to input terminals 92 and 94 of on-off type voltage regulator circuit 100, and voltage regulator circuit 100 has its output terminals 96, 98 and 102 connected in circuit relation with a source 110 of direct current potential and exciter field winding 20. Direct current source 110 has its positive output terminal 104 connected in circuit relation with terminal 96 of voltage regulator 100 and one side of exciter field winding 20, and its negative output terminal 106 is connected in circuit relation with terminal 102 of voltage regulator 100. The remaining output terminal 98 of voltage regulator 100 is connected to the remaining side of exciter field winding 20. Thus, the complete path from the positive terminal 104 of direct current source 110 through exciter field winding 20 includes the on-off type voltage regulator 100, with voltage regulator 100 controlling the average magnitude of direct current allowed to flow from source potential 110 through exciter field winding 20, in response to the deviation of the output voltage of alternating current generator 10 from the desired regulated value. Any change in excitation current through exciter field winding 20 changes the output potential of exciter armature 18, which in turn changes the amount of excitation current flowing through generator field winding 14, which changes the output potential of generator 10 accordingly.

Since the voltage regulator 100 will always try to maintain the desired output potential on line conductors 34, 36 and 38, and since in aircraft electrical systems the generator-regulator system is capable of delivering electrical power for short periods of time that greatly exceeds the power capability of the driving means 24, which may cause serious damage to the driving means 24 as well as the possibility of shearing the drive shaft 22, some means is required to override the voltage regulator to limit the torque imposed on the drive shaft 22 and power demand imposed on driving means 24.

This invention accomplishes the torque or power limiting by a limiter circuit 120, which limits the output current of voltage regulator 100 to a predetermined magnitude. Thus, the excitation current applied to exciter field winding 20 is limited to a magnitude which will keep the torque or power demand upon drive shaft 22 and driving means 24 within predetermined limits. The limiter circuit 120 is fast acting and has a high gain, enabling the limiter circuit 120 to sense and be responsive to the ripple in the voltage drop across an impedance means 122 connected in series circuit relation with exciter field winding 20. The ripple component in the voltage drop across impedance means 122 is induced into the field circuit from the rotating rectifier circuit 67.

Limiter circuit 120 has its terminals 122 and 124 connected across impedance means 122 at junctions 126 and 128, respectively, in order to be responsive to the magnitude of the voltage drop across the impedance means and thus be responsive to the magnitude of current flowing through exciter field winding 20. Terminals 130, 132 and 134 of limiter circuit 120 are connected to terminals 136, 138 and 140 of voltage regulator circuit 100 in order to override voltage regulator 100 when the exciter current magnitude reaches the limiting value.

Impedance means 122 is illustrated as comprising two resistors, 142 and 144 connected in series at terminal 46, to illustrate that the limiter circuit 120 may be used with different ratings of generators without modification. The limiter circuit, for example, may be operated with either one of two different generator ratings, with no adjustments being required after initial adjustments are made to the limiter circuit. It would merely be necessary to connect conductor 148 to terminal 128, as shown, or to terminal 146, depending upon the particular generator rating being used. With more than two generator ratings, the required number of resistors of the proper size may be connected in series, with conductor 148 merely being connected to the proper junction relating to the generator size being used.

FIG. 2 illustrates schematically a limiter circuit 120 embodying the teachings of the invention, as well as error detecting and voltage regulating circuits 80 and 100 respectively, that may be used. The error detector circuit has its input terminals 82, 84 and 86 connected to a rectifier 150, which may be a three-phase, full-wave rectifier, as shown, having semiconductor diodes 152, or a three-phase half wave rectifier, or a single phase rectifier. The rectifier 150 provides a unidirectional output voltage at its output conductors 154 and 156 whose magnitude is proportional to the magnitude of the output potential of alternating current generator 10.

The unidirectional output voltage appearing at conductors 154 and 156 is applied through rheostat 158 to the input terminals 162 and 164 of error detecting bridge circuit 160. Bridge circuit 160 includes two parallel branches, with the first branch comprising Zener type diode 170 and resistor 172 and the second branch comprising resistor 174 and Zener type diode 176. An error signal appears across output terminals 166 and 168, with its polarity depending upon whether the voltage applied to its input terminals is greater or less than the reference voltage of the bridge circuit. The reference voltage of the bridge circuit is twice the voltage drop across one of the Zener diodes. If the voltage applied to input terminals 162 and 164 is greater than the reference voltage of bridge circuit 160, indicating the output voltage of the alternating current generator 10 is above the desired magnitude, output terminal 166 will be more positive than output terminal 168. If the voltage applied to input terminals 162 and 164 is less than the reference voltage, indicating that the output voltage of alternating current generator 10 is below the desired magnitude, output terminal 168 will be more positive than output terminal 166. Rheostat 158 may be used to adjust the regulated value of voltage at which the voltage regulator 100 is to maintain the output voltage of the generator 10.

The error signal or voltage appearing at output terminals 166 and 168 of bridge circuit 160 is applied to output terminals 88 and 90 of error detecting circuit 80, with current limiting resistor 178, inductance 180, and capacitance 182 forming a compensation network for stabilizing the operation of the regulator-excitation system 70.

From output terminals 88 and 90 of error detecting circuit 80, the error signal is applied to input terminals 92 and 94 of voltage regulator 100. In general, voltage regulator 100 is of the switching or "on-off" type, in which solid state switching means, such as a transistor, is connected in series circuit relation with the exciter field winding 20 and source of direct current potential 110. The switching means allows pulses of direct voltage to be applied to the exciter field winding 20, the voltage pulse width, and hence the average excitation current, being responsive to the error signal applied to its input terminals 92 and 94.

More specifically, the error signal from error detecting circuit 80 is applied to the base-emitter circuit of an NPN type transistor 190, having a base $b$, emitter $e$, and collector $c$. The base $b$ is connected to terminal 92 and the emitter $e$ is connected to terminal 94 through conductor 192. The collector $c$ is connected to the positive terminal of direct current source 110 through resistors 192 and 194. Assuming that the output voltage of the alternating current generator 10 is below the desired magnitude, the emitter *e* will be more positive than the base *b*, of transistor 190, thus transistor 190 will be in its non-conducting or "cut-off" mode. Transistor 200, having a base *b*, collector *c*, and emitter *e*, has its base *b* connected to the collector *c* of transistor 190, its emitter *e* connected to conductor 192, and its collector *c* connected to the positive terminal 104 of source potential 110 through resistors 196 and 194. Thus, when transistor 190 is non-conducting, base drive will be provided for transistor 200 from direct current source 110, driving transistor 200 to saturation, or its conducting mode. Zener diode 198 is connected across the direct current potential applied to transistors 190 and 200 to regulate the supply voltage.

Transistor 210, having a base *b*, collector *c*, and emitter *e*, has its base *b* connected to the collector *c* of transistor 200 through blocking diode 202, its emitter *e* connected to conductor 192, and its collector *c* connected to the positive terminal 104 of source potential 110 through resistor 204. When transistor 200 is conducting, there will be no base drive applied to transistor 210, thus transistor 210 will be in its non-conducting mode.

Transistor 220, having a base *b*, collector *c*, and emitter *e*, has its base *b* connected to the collector *c* of transistor 210, its emitter *e* connected to conductor 192 through resistor 208, and its collector *c* connected to the positive terminal 104 of source potential 110 through resistor 206. When transistor 210 is non-conducting, base drive will be applied to transistor 220 from direct current source 110, switching transistor 220 to its conducting mode.

Transistor 230, having a base *b*, collector *c* and emitter *e*, has its base *b* connected to the emitter *e* of transistor 220, its emitter *e* connected to conductor 192 through resistor 209, and its collector *c* connected to one side of exciter field winding 20. Transistor 240, having a base *b*, collector *c*, and an emitter *e*, has its base *b* connected to the emitter *e* of transistor 230, its emitter *e* connected through blocking diode 212 to conductor 192, and its collector *c* connected to one side of exciter field winding 20 at terminal 98. Thus, when transistor 220 is in its conducting mode, base drive will be applied to the base *b* of transistor 230, switching transistor 230 to its conducting mode, and base drive will also be applied to the base *b* of transistor 240, switching transistor 240 to its conducting mode. Therefore, when the output voltage of alternating current generator 10 is below the desired value, current from direct current source 110 will flow from its positive terminal 104 to terminal 126, through impedance means 122, through exciter field winding 20, and through the collector-emitter path of transistor 240, back to the negative terminal 106 of direct current source 110. Current flow through exciter field winding 20 increases the output voltage of the exciter armature 18, increasing the excitation current in the alternating current generator field winding 14, and increasing the output voltage of the alternating generator 10.

When the output voltage of alternating current generator 10 exceeds the desired magnitude, the polarity of the error signal applied to terminals 92 and 94 of voltage regulator 100 will change, with terminal 92 and the base *b* of transistor 190 becoming more positive than the terminal 94 and the emitter *e*. Thus, base drive is applied to transistor 190, turning it on. Transistor 200 will then lose its base drive when transistor 190 conducts, causing transistor 200 to switch to its non-conducting mode. When transistor 200 becomes non-conducting, base drive for transistor 210 will then be available through blocking diode 202, switching transistor 210 to its conducting mode. When transistor 210 conducts, base drive for transistor 220 will be lost, switching transistor 220 to its non-conducting mode. When transistor 220 becomes non-conducting, base drive for transistor 230 will be lost, switching transistor 230 to its non-conducting mode. When transistor 230 becomes non-conducting, base drive for transistor 240 will be lost, switching transistor 240 to its non-conducting mode. When transistor 240 becomes non-conducting, the circuit including the direct current source 110 and exciter field winding 20 is interrupted, allowing the flow of excitation current through the exciter field winding 20 to decay, discharging through commutating rectifier 216. When the current flow through transistor 240 is interrupted, the output voltage of exciter armature 18 starts to fall, the alternating current generator field current is reduced, and the output voltage of the alternating current generator 10 is reduced. Rectifier 214 protects transistor 240 from transient voltage surges. When the alternating current generator's output voltage falls below the regulated value, the polarity of the error signal will again change, and the cycle hereinbefore described will be repeated, with transistor 240 switching "on" and "off" to maintain an average excitation current through exciter field winding 20 that will maintain the output voltage of the alternating current generator 10 at substantially the desired value.

In order to limit the output power of the driving means 24 and the torque applied to drive shaft 22, to prevent damage to driving means 24 and the possible shearing of the drive shaft 22, limiting circuit 120 overrides the voltage regulator 100 when the excitation current in exciter field winding 20 reaches a predetermined magnitude. When the predetermined excitation current magnitude is reached, the switching transistor 240, connected in series with the source of direct current potential 110 and exciter field winding 20, is switched "on" and "off" at the rate of the ripple frequency of the rectifier 67. Thus, even though the error signal may call for increased exciter field current, limiter circuit 120 will cause transistor 240 to switch "on" and "off" at a rapid rate, with a ratio of "on" to "off" time that is required to maintain the excitation current at the predetermined magnitude.

More specifically, the limiter circuit 120 is responsive to the exciter excitation current through its terminals 122 and 124, with terminal 122 being connected to junction 126 on one side of impedance means 122 and terminal 124 being connected to junction 128 on the other side of impedance means 122. The direct current voltage drop across impedance means 122 is proportional to the excitation current flowing through its impedance means 122, and in addition, the voltage drop has a ripple component impressed upon it, which has been induced into the field circuit from the brushless exciter 16. This voltage proportional to the exciter excitation current is applied across resistors 250 and 252, with resistor 252 being adjustable to allow the limiter circuit 120 to be initially adjusted to compensate for any differences in the Zener breakdown voltage of Zener type diode 254 from its rated value. Semiconductor diode 256, having an anode *a*, and cathode *c*, a PNP type transistor 258, having a base *b*, emitter *e* and collector *c*, resistor 260, and a Zener diode 254, having a cathode *c* and an anode *a*, are connected such that transistor 258 will be non-conductive until a predetermined voltage drop across impedance means 122 is reached, at which time transistor 258 will be switched to its conductive mode. This is accomplished by connecting semiconductor diode 256, the base-emitter path of transistor 258, Zener diode 254 and current limiting resistor 260 serially across the impedance means 122, with the anode *a* of diode 256 being connected to terminal 122, its cathode *c* being connected to the emitter *e* of transistor 258, the base *b* of transistor 258 being connected to resistor 260, resistor 260 being connected to the cathode *c* of Zener diode 254, and the anode *a* of Zener diode 254 being connected to adjustable resistor 252. The emitter-collector path of transistor 258 is completed through resistors 262 and 264 to terminal 130 and hence to conductor 192 back to the negative terminal 106 of unidirectional source 110. The voltage drop across impedance means 122 will then have to exceed the sum of threshold voltage levels of semiconductor diode 256 and the base *b* of transistor 258, and the breakdown voltage of Zener diode 254, before base current will flow in transistor 258, to switch it to its conductive mode. As long as the voltage drop across impedance means 122 is below the sum of these three voltages, transistor 258 will be non-conductive and limiter circuit 120 will have no affect on the operation of regulator 100.

When the exciter excitation current reaches a magnitude which produces a voltage drop across impedance means 122 that exceeds the threshold voltage of diode 256 and the base *b* of transistor 258, and the reverse breakdown voltage of Zener diode 254, base current will flow in transistor 258, switching it to its conductive mode and allowing current to flow through resistors 262 and 264.

An NPN type transistor 270, having a base *b*, collector *c*, and emitter *e* is connected to be responsive to the voltage produced across resistors 262 and 264 when current flows therethrough, with the base *b* of transistor 270 being connected to the junction 272 between resistors 262 and 264, the emitter *e* being connected to the junction 274 on the other side of resistor 264, and the collector *c* being connected to the base electrode *b* of transistor 200 in voltage regulator circuit 100, through terminals 132 and 138. When current flows through transistor 258 and resistors 262 and 264, the base-emitter junction of transistor 270 will be forward biased, switching transistor 270 to its conductive state. Thus, transistor 200 is not only responsive to transistor 190, it is also responsive to transistor 270 in current limiting circuit 120. If transistor 190 is in its non-conducting mode, indicating that excitation current should be allowed to flow through field winding 20, but transistor 270 is conducting, indicating that the limiting excitation current magnitude has been reached, transistor 200 will be switched off, as transistor 200 loses its base drive when transistor 270 conducts. As hereinbefore described, when transistor 200 is switched off, transistor 210 is switched to its conductive mode and transistors 220, 230 and 240 are switched to their non-conducting modes, thus removing the power supply or source voltage 110 from the exciter field 20.

Instead of sensing the direct current level of the voltage drop across impedance means 122, and switching transistor 258 "on" and "off" at the relatively slow rate responsive to when the direct current voltage level goes above and below the reference level, which may produce system oscillations and instabilities, the limiter circuit senses the ripple component of the direct current voltage drop, turning transistors 258 and 270 on and off at the ripple frequency when the limiting magnitude of excitation current is flowing. This switches the transistors 200, 210, 220, 230 and 240 at the ripple frequency also, producing pulses of excitation voltage with a ratio of on-to-off time which is automatically determined to produce an average excitation current that will not exceed the limiting magnitude. The ripple frequency switching rate is much too high for the system to follow, hence the torque or power limiting mode provides absolute system stability with a complete absence of the oscillations, produced in many systems when they are in their torque limiting mode. Further, the limiter circuit 120 is sensitive to very slight changes of voltage drop across impedance means 122 due to its very high gain, resulting in substantially no change in the limiting value of excitation current, even during short circuit conditions.

In order to reduce leakage in transistor 258 and reduce switching time, semiconductor diode 256 reverse biases the emitter-base junction of transistor 258. Resistor 280 completes the reverse bias circuit of transistor 258, by its connection from the emitter *e* of transistor 240 to the emitter *e* of transistor 258, through terminals 134 and 140.

In order to maintain the same current limiting value, within ±1% over a temperature range of −55° C. to +71° C., impedance means 122 should comprise precision resistors, and one of the two base-emitter-resistors 282 or 284 connected across the base-emitter junction of transistor 258, should have a negative temperature coefficient for temperature compensation.

Figure 3:
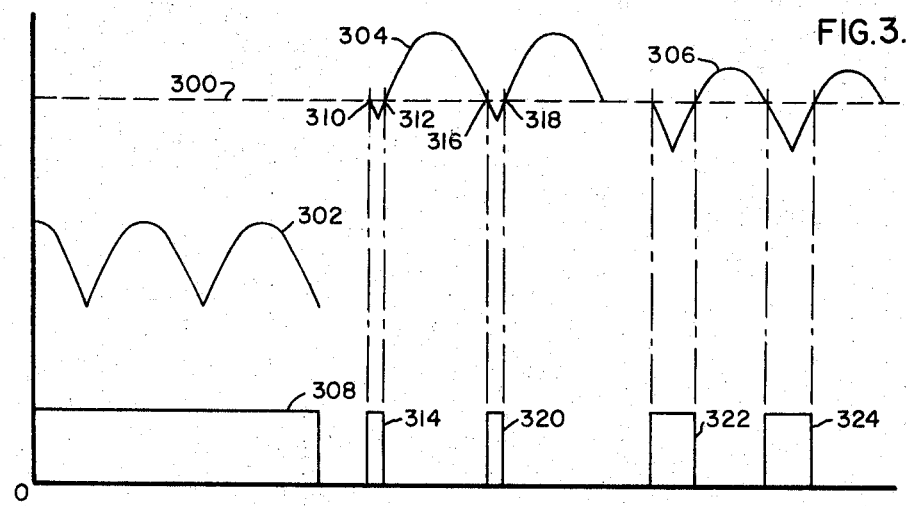
FIG. 3 is a graph which illustrates the effect of the limiter circuit on the exciter field current.

The graph in FIG. 3 is explanatory of the operation of the limiter circuit 120. The dotted line 300 illustrates the voltage drop across impedance means 122 that will cause transistor 258 to conduct and switch transistor 240 to its non-conductive mode. Waveforms 302, 304 and 306, show the direct current voltage drop across impedance means 122, with the induced ripple being greatly enlarged for illustrative purposes.

First, assume the voltage regulator signals that more excitation current is required and that the excitation current is below the limiting magnitude. The voltage drop across impedance means 122 is represented by waveform 302, and the voltage applied to the exciter field winding is represented by block 308.

Now, assume that the excitation current has continued to increase until it has exceeded the limiting value. The shortage drop across impedance means 122 will then exceed line 300. This is represented by waveform 304. Also, assume that voltage regulator 100 is signaling for more excitation current. As soon as the ripple component in the waveform 304 exceeds line 300, transistor 240, connected in series with source voltage 110 and exciter field winding 20, will remove the source voltage 110 from the field winding 20, and no further excitation current will be provided. When the ripple component falls below line 300, additional field current will be allowed to flow. For example, from point 310 to point 312 the waveform 304 is below line 300 and pulse 314 of excitation voltage will be applied to the exciter field, and from point 312 to point 316 waveform 304 exceeds line 300 and the source voltage 110 is removed from the field winding. From point 316 to point 318, the source 10 is again connected to exciter field winding 20 and pulse 320 of voltage will be applied to the exciter field. The succession of voltage pulses 314 and 320 produces an average field excitation current which will not exceed the limiting value.

If the waveform does not exceed line 300 to the extent that waveform 304 does, for example waveform 306, the pulses of field voltage will be wider, as evidenced by pulses 322 and 324. Thus, by pulse width modulation, the field current through exciter field winding 20 is limited by limiter circuit 120 to a predetermined maximum value, thus limiting the power that has to be provided by driving means 24 to the input shaft 22, shown in FIG. 1.

Actual test results produced with a limiter circuit constructed according to the teachings of this invention, and utilized with a 40 kva., three-phase alternating current generator, are shown in the graphs of FIGS. 4 and 5, with FIG. 4 showing the results with a unity power factor load, and FIG. 5 showing the results with a .75 lagging power factor load. The dotted line extensions of the various curves show how the curves would continue in the absence of a limiting circuit. Oscillograms taken during the limiting action showed a stable condition.

More specifically, the abscissa of the graphs in FIGS. 4 and 5 represent the generator line current, and the ordinate represents the load power per phase, exciter field amperes, and line-to-neutral voltage. The dot-dash lines 330 represent the load power per phase, the dash lines 340 indicate the exciter field amperes, and the solid lines 350 indicate the line-to-neutral voltage. The limiter circuit overrode the voltage regulating circuit at vertical lines 360. It will be noted that the exciter field current remained at a constant magnitude after line 360, causing the load power and line-to-neutral voltage to decrease.

The limiter circuit 120 does not require any complicated circuitry and is very easy to set-up and adjust. The only precision components required are the resistors used in impedance means 122, as all of the transistors operate in the switching mode. Once the adjustable resistor 252 is set, the limiter circuit will operate with any regulator having a switching solid state device connected in series with the exciter field winding and source potential, and any rating of generator may be used with the limiter, simply by including the proper magnitude and ratio of resistors in impedance means 122. When a different rating of generator is used, lead 148 would only have to be moved to the terminal in impedance means 122 corresponding to the generator rating.

Further, the limiter is absolutely stable, as the switching is conducted at the ripple frequency of the rotating exciter, the rate being too rapid for the system to follow. The only time constant is the exciter field, unlike the limiter-regulator circuits which utilize magnetic amplifiers. The high gain of the limiter circuit assures that the limiting magnitude will remain unchanged, even during short circuit conditions.

It is to be understood that although the teachings of the invention have been illustrated with a brushless alternating current generator system, it may also be utilized with alternating or direct current generators, of the brush or brushless type. When used with brush type generators, if insufficient ripple is induced into the exciter field current from the mechanical rectification (commutator) of the exciter output voltage, a relatively high frequency ripple may be coupled into impedance means 122 from a local oscillator, such as a transistor sawtooth generator.

In summary, there has been shown and described a limiter circuit for limiting the power applied to the input shaft of a dynamoelectric machine, which has successfully eliminated complex circuitry and critical components, and provides a stable system having a high gain and a limiting magnitude which remains unchanged over a wide temperature range regardless of circuit conditions.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

We claim as our invention:

1. An excitation current limiting system for a dynamoelectric machine having a field winding whose excitation current from a source of potential is controlled by a switching type regulator, comprising first means connected in circuit relation with said field winding, said regulator and said source of potential, producing a voltage drop responsive to the magnitude of the excitation current flowing through said field winding; said dynamoelectric machine inducing a ripple component into the current flowing through said field winding which appears in the voltage drop across said first means; second means connected in circuit relation with said first means responsive to the voltage drop across said first means; said second means being switchable from a non-conductive state to a conductive state in response to a signal of predetermined magnitude; said second means switching at the frequency of said ripple component when the excitation current produces a voltage drop across said first means having a predetermined magnitude; said second means being connected in circuit relation with said regulator; said regulator being responsive to the switching of said second means, with said regulator switching the source of potential at the frequency of said ripple component to maintain the excitation current at a predetermined magnitude.

2. An excitation current limiting system for a dynamoelectric machine having a field winding whose excitation current from a source of potential is controlled by a switching type regulator having a solid state switching device connected in circuit relation with said field winding and said source of potential, comprising first means connected in circuit relation with said field winding, said solid state switching device, and said source of potential, producing a voltage drop responsive to the magnitude of the current flowing through said field winding; said dynamoelectric machine inducing a ripple component into the current flowing through said field winding which appears in the voltage drop across said first means; second means connected in circuit relation with said first means responsive to the voltage drop across said first means; said second means being switchable from a non-conductive state to a conductive state in response to a signal of predetermined magnitude; third means connected in circuit relation with said first and second means; said third means determining the voltage drop across said first means that will cause said second means to switch from its non-conductive state to its conductive state; said second means switching at the rate of said ripple component when the voltage drop across said first means reaches the magnitude set by said third means; said second means being connected in circuit relation with said regulator; said regulator being responsive to the switching of said second means, with said solid state switching device switching the source of potential at the frequency of said ripple component to maintain the excitation current at a predetermined magnitude while said second means is switching.

3. An excitation current limiting system for a dynamoelectric machine having a field winding whose excitation current is supplied by a brushless exciter having a field winding whose excitation current from a source of potential is controlled by an on-off type regulator, comprising impedance means connected in circuit relation with said field winding, said regulator and said source of potential, producing a voltage drop responsive to the magnitude of the excitation current flowing through the exciter field winding; said brushless exciter inducing a ripple component into the current flowing through the exciter field winding which appears in the voltage drop across said impedance means; solid state switching means connected in circuit relation with said impedance means responsive to the voltage drop across said impedance means; said solid state switching means being switchable from a non-conductive state to a conductive state in response to a voltage signal of predetermined magnitude; said solid state switching means switching at the frequency of said ripple component when the excitation current produces a voltage drop across said impedance means having a predetermined magnitude; said solid state switching means being connected in circuit relation with said regulator; said regulator being responsive to the switching of said solid state switching means; said regulator switching the source of potential applied to said exciter field winding at the frequency of said ripple component and with the ratio of conductive time to non-conductive time required to maintain the excitation current at a predetermined magnitude.

4. An excitation current limiting system for a dynamoelectric machine having a field winding whose excitation current is provided by a brushless exciter having a field winding whose excitation current from a source of potential is controlled by an on-off type regulator, comprising first means connected in circuit relation with said field winding, said regulator and said source of potential; said first means comprising an impedance which produces a voltage drop having a magnitude responsive to the magnitude of the excitation current flowing through said field winding; said brushless exciter inducing a ripple component into the current flowing through said field winding which appears in the voltage drop across said first means; second means including first and second transistors; said first transistor being connected in circuit relation with said first means and being responsive to the voltage drop across said first means; said first and second transistors being switchable from a non-conductive state to a conductive state in response to a signal of predetermined magnitude; third means including a Zener diode connected in circuit relation with said first means and said first transistor; said third means determining the magnitude of the voltage drop across said first means that will switch said first transistor to its conductive state; said first transistor switching at the frequency of said ripple component when the excitation current produces a voltage drop across said first means having the magnitude determined by said third means; said second transistor being connected in circuit relation with said first transistor and said regulator; said second transistor being switched in response to the switching of said first transistor and causing said regulator to switch the source of potential at the ripple frequency, to maintain the excitation current at a predetermined magnitude.

5. An excitation system for a dynamoelectric machine having output terminals and a field winding which limits the shaft input power required by the dynamoelectric machine, comprising first means providing an error signal responsive to the deviation of the voltage at the output terminals of said dynamoelectric machine from a predetermined magnitude; second means comprising a regulator having at least one solid state switching device; said second means being connected in circuit relation with said first means; third means providing a unidirectional potential; said second means, said third means and said field winding being connected in circuit relation, with the solid state switching device of said second means being switched from a non-conductive state to a conductive state in response to said error signal to provide the desired excitation current; fourth means connected in circuit relation with said field winding producing a voltage drop responsive to the magnitude of said excitation current; said dynamoelectric machine inducing a ripple component into said excitation current which appears in the voltage drop across said fourth means; fifth means connected in circuit relation with said fourth means responsive to the voltage drop across said fourth means; said fifth means being switchable from a non-conductive state to a conductive state in response to a signal of predetermined magnitude; said fifth means switching at the frequency of said ripple component when the excitation current produces a voltage drop across said fourth means having a predetermined magnitude; said fourth means being connected in circuit relation with said second means; said second means being responsive to the switching of said fourth means, with the solid state switching device of said second means switching the unidirectional potential applied to the field winding by said third means at the frequency of said ripple component, to maintain the excitation current at a predetermined magnitude during the time said fourth means is switching.

6. An excitation system for a dynamoelectric machine having output terminals and a field winding which limits the shaft input power required by the dynamoelectric machine, comprising first means providing an error signal responsive to the deviation of the voltage at the output terminals of said dynamoelectric machine from a predetermined magnitude; second means comprising a regulator having at least one solid state switching device; said second means being connected in circuit relation with said first means; third means providing a unidirectional potential; said second and third means and said field winding being connected in circuit relation, with said solid state switching device of said second means being switched from a nonconductive to a conductive state in response to said error signal to provide the average excitation current required to maintain the voltage at the terminals of said dynamoelectric machine at the predetermined magnitude; fourth means connected in circuit relation with said field winding, said solid state switching device and said source of potential, producing a voltage drop responsive to the magnitude of current flowing through said field winding; said dynamoelectric machine inducing a ripple component into the current flowing through said field winding, which appears in the voltage drop across said fourth means; fifth means connected in circuit relation with said forth means responsive to the voltage drop across said fourth means; said fifth means being switchable from a non-conductive state to a conductive state in response to a signal of predetermined magnitude; sixth means connected in circuit relation with said fourth means; said sixth means determining the magnitude of the voltage drop across said fourth means that will cause said fifth means to switch from its non-conductive state to its conductive state; said fifth means switching at the frequency of said ripple component when the voltage drop across said fourth means reaches the magnitude determined by said sixth means; said fifth means being connected in circuit relation with said second means; said second means being responsive to the switching of said fifth means, with the solid state switching device of said second means switching the potential applied to the field winding by said third means at the frequency of said ripple component, to maintain the excitation current at a predetermined magnitude when said fifth means is switching, regardless of the magnitude or polarity of said error signal.

7. An excitation system for a dynamoelectric machine having output terminals and a field winding, whose excitation current is supplied by a brushless exciter having a field winding, which limits the shaft input power required by the dynamoelectric machine, comprising first means providing an error signal responsive to the deviation of the voltage at the output terminals of said dynamoelectric machine from a predetermined magnitude; second means comprising a regulator having at least one solid state switching device; said second means being connected in circuit relation with said first means; third means providing a unidirectonal potential; said second and third means and said field winding being connected in circuit relation, with said solid state switching device of said second means beng switched from a non-conductive to a conductive state in response to said error signal to provide the average excitation current required to maintain the voltage at the terminals of said dynamoelectric machine at the predetermined magnitude; impedance means connected in circuit relation with said exciter field winding, said solid state switching device, and said source of potential, producing a voltage drop responsive to the magnitude of the excitation current flowing through the exciter field winding; said brushless exciter inducing a ripple component into the current flowing through the exciter field winding which appears in the voltage drop across said impedance means; transistor switching means connected in circuit relation with said impedance means responsive to the voltage drop across the impedance means; said transistor switching means being switchable from a non-conductive state to a conductive state in response to a voltage signal of predetermined magnitude, said transistor switching means switching at the frequency of said ripple component when the excitation current produces a voltage drop across said impedance means having a predetermined magnitude; said transistor switching means being connected in circuit relation with said second means, said second means being responsive to the switching of said transistor switching means, with the solid state switching means of said second means switching the unidirectional potential applied to said exciter field winding by said third means at the frequency of said ripple component and with a ratio of conductive time to non-conductive time which maintains the excitation current at a predetermined magnitude regardless of the magnitude or polarity of said error signal.

8. An excitation current limiting system for a dynamoelectric machine having output terminals and a field winding, whose excitation current is provided by a brushless exciter having a field winding, which limits the shaft input power required by the dynamoelectric machine, comprising first means providing an error signal responsive to the deviation of the voltage at the output terminals of said dynamoelectric machine from the predetermined magnitude; second means comprising a regulator having at least one solid state switching device; said second means being connected in circuit relation with said first means; third means providing a unidirectional potential; said second and third means and said field winding being connected in circuit relation, with said solid state switching device of said second means being switched from a non-conductive to a conductive state in response to said error signal to provide the average excitation current required to maintain the voltage at the terminals of said dynamoelectric machine at the predetermined magnitude; fourth means connected in circuit relation with said exciter field winding, said second means, and said source of potential; said fourth means comprising an impedance which produces a voltage drop having a magnitude responsive to the magnitude of the excitation current flowing through the exciter field winding; said brushless exciter inducing a ripple component into the current flowing through said exciter field winding which appears in the voltage drop across said fourth means; fifth means including first and second transistors; said first transistor being connected in circuit relation with said fourth means and responsive to the voltage across said fourth means; said first and second transistors being switchable from a non-conductive state to a conductive state in response to a voltage signal of predetermined magnitude; sixth means including a Zener diode connected in circuit relation with said fourth means and said first transistor; said sixth means determining the magnitude of voltage drop across said fourth means that will switch said first transistor to its conductive state; said first transistor switching at the frequency of said ripple component when the excitation current produces a voltage drop across said fourth means having the magnitude determined by said sixth means; said second transistor being connected in circuit relation with said first transistor and said second means; said second transistor being switched in response to the switching of said first transistor and causing the solid state switching means of said second means to switch the unidirectional potential applied to said field winding by said third means at the ripple frequency, to maintain the excitation current at a predetermined magnitude regardless of the magnitude or polarity of said error signal.

References Cited
UNITED STATES PATENTS

| | | | |
|---|---|---|---|
| 3,209,235 | 9/1965 | Roof | 322—28 |
| 3,211,987 | 10/1965 | Gatlin et al. | 322—28 X |
| 3,254,293 | 5/1966 | Steinbruegge | 322—59 X |
| 3,268,796 | 8/1966 | Steinbruegge | 322—28 |
| 3,284,694 | 11/1966 | Roof et al. | 322—28 |

MILTON O. HIRSHFIELD, *Primary Examiner.*

R. V. LUPO, *Assistant Examiner.*